US012642276B2

(12) United States Patent
Haynes et al.

(10) Patent No.: US 12,642,276 B2
(45) Date of Patent: Jun. 2, 2026

(54) SYSTEMS AND METHODS FOR ROTATING PRODUCTS DURING PROCESSING

(71) Applicant: Georgia Tech Research Corporation, Atlanta, GA (US)

(72) Inventors: Comas Haynes, Atlanta, GA (US); Aklilu G. Giorges, Atlanta, GA (US); Saikamal Srinivas, Atlanta, GA (US); Sean L. Thomas, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 19/297,560

(22) Filed: Aug. 12, 2025

(65) Prior Publication Data

US 2025/0359560 A1     Nov. 27, 2025

Related U.S. Application Data

(63) Continuation of application No. 18/246,537, filed as application No. PCT/US2021/053193 on Oct. 1, 2021, now Pat. No. 12,396,465.

(60) Provisional application No. 63/212,185, filed on Jun. 18, 2021, provisional application No. 63/086,652, filed on Oct. 2, 2020.

(51) Int. Cl.
| | |
|---|---|
| *A22B 7/00* | (2006.01) |
| *A22B 5/00* | (2006.01) |
| *A22C 21/00* | (2006.01) |
| *A22C 21/04* | (2006.01) |

(52) U.S. Cl.
CPC ............ *A22B 7/003* (2013.01); *A22B 5/0076* (2013.01); *A22C 21/0053* (2013.01); *A22C 21/04* (2013.01)

(58) Field of Classification Search
CPC ...... A22C 21/0076; A22B 7/003; A22B 5/007
USPC .................................................. 452/187–189
See application file for complete search history.

(56) References Cited

U.S. PATENT DOCUMENTS

| | | | | |
|---|---|---|---|---|
| 2,423,560 A | * | 7/1947 | Lenus ................ | A22C 21/0007 452/183 |
| 3,515,717 A | | 6/1970 | Cha et al. | |
| 3,518,717 A | * | 7/1970 | Hamann ............ | A22C 21/0053 452/179 |

(Continued)

FOREIGN PATENT DOCUMENTS

| | | |
|---|---|---|
| CN | 106376640 A | 2/2017 |
| JP | S4922029 B1 | 6/1974 |

(Continued)

OTHER PUBLICATIONS

International Search Report and Written Opinion from Application No. PCT/US2020/053193 dated Jan. 13, 2022 (15 pages).

(Continued)

*Primary Examiner* — Richard T Price, Jr.
(74) *Attorney, Agent, or Firm* — TROUTMAN PEPPER LOCKE LLP; Ryan A. Schneider; Dustin B. Weeks

(57) ABSTRACT

Systems and methods for rotating a product during processing including a shackle system including a trolley, a rotator, and a rotating shackle and a track. The trolley is coupled to the track and configured to undergo translational motion along the track causing the shackle system to move along the track. The rotator is configured to undergo rotational kinematics causing rotation of the rotating shackle.

27 Claims, 11 Drawing Sheets

(56)                    References Cited

U.S. PATENT DOCUMENTS

| | | | | |
|---|---|---|---|---|
| 3,684,078 A | * | 8/1972 | Nielsen | B65G 17/485 |
| | | | | 198/377.01 |
| 3,864,078 A | | 2/1975 | Gealy et al. | |
| 4,180,152 A | * | 12/1979 | Sefcik | B65G 47/244 |
| | | | | 198/377.06 |
| 5,875,738 A | | 3/1999 | Hazenbroek et al. | |
| 5,939,115 A | * | 8/1999 | Kounev | A23B 4/015 |
| | | | | 134/131 |
| 6,010,398 A | | 1/2000 | Mente | |
| 6,179,701 B1 | * | 1/2001 | Tieleman | A22C 21/0053 |
| | | | | 452/179 |
| 6,179,702 B1 | * | 1/2001 | Hazenbroek | A22C 21/0053 |
| | | | | 452/179 |
| 2002/0090905 A1 | | 7/2002 | Moriarty | |

FOREIGN PATENT DOCUMENTS

| | | | |
|---|---|---|---|
| JP | H04237454 A | 8/1992 |
| JP | H0627737 U | 4/1994 |
| JP | H0672944 U | 10/1994 |

OTHER PUBLICATIONS

Extended European Search Report from Application No. EP 218766601.2 dated Sep. 24, 2024 (8 pages).

* cited by examiner

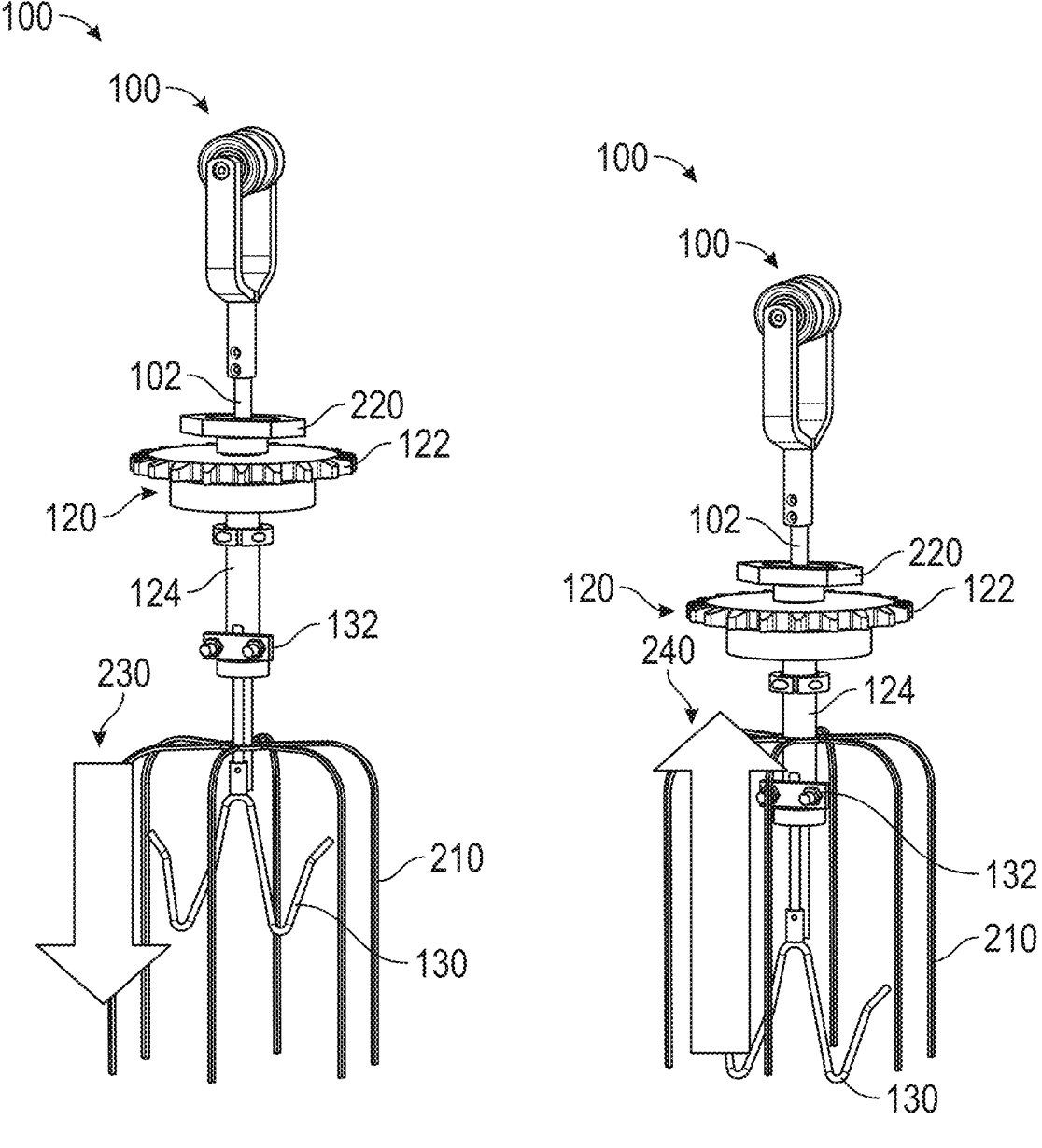
FIG. 2B        FIG. 2C

120

810

810

Top View

Alternating Pegs

820

810

120

Shackle Movement

810

820

SYSTEMS AND METHODS FOR ROTATING PRODUCTS DURING PROCESSING

CROSS-REFERENCE TO RELATED APPLICATIONS

This Application is a continuation of U.S. patent application Ser. No. 18/246,537 filed 24 Mar. 2023, which U.S. patent application Ser. No. 18/246,537 is a § 371 National Stage of International Patent Application No. PCT/US2021/053193, with an international filing date of 1 Oct. 2021, which International Patent Application No. PCT/US2021/053193 claims the benefit under 35 USC § 119 (e) of U.S. Provisional Patent Application No. 63/086,652 filed 2 Oct. 2020 and U.S. Provisional Patent Application No. 63/212,185 filed 18 Jun. 2021, each of which is incorporated herein by reference in its entirety as if fully set forth below.

STATEMENT REGARDING FEDERALLY SPONSORED RESEARCH OR DEVELOPMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Disclosure

The present disclosure relates generally to processing systems and methods and more particularly to systems and methods for rotating food products during processing.

BACKGROUND

2. Background

Reducing or precluding cross-contamination of products during processing is desirable. For example, processing carcasses (i.e., meat product) with a system where the carcasses do not come into mutual contact can reduce or preclude cross-contamination. Traceability of the products throughout processing is also important. Improved heat transfer during processing is also desirable. For example, improved heat transfer during the chilling of carcasses can reduce processing time, save energy, save space, and reduce the chance of contamination. Uniform heat transfer can further improve processing by providing reliability and consistency in steps such as chilling and scalding. Additionally, having uninterrupted "inline" processing of product is valuable, because the "rehang" step of having to put conventionally immersion-chilled poultry carcasses back on to shackles has various challenges.

Therefore, what is needed is system and method for inline processing that includes both rotational and translational movement of products through the processing steps.

BRIEF SUMMARY OF THE DISCLOSURE

The present disclosure relates to processing systems and methods. The disclosed technology includes a system for rotating a product during processing.

In an exemplary embodiment, the present system for rotating a product during processing can include a shackle system. The shackle system can include a trolley, a rotator, and a rotating shackle. The shackle system can include a track. The trolley can be coupled to the track and configured to undergo translational motion along the track causing the shackle system to move along the track. The rotator can be configured to undergo rotational kinematics causing rotation of the rotating shackle.

In exemplary embodiments, the rotation of the rotating shackle can be caused, at least in part, by the track causing the rotational kinematics on the rotator as the shackle system moves along the track.

In exemplary embodiments, the rotator can include a gear. The track can include a rack. The gear can mesh with the rack causing the rotational kinematics on the rotator as the shackle system moves along the track.

In exemplary embodiments, the rotator can include a peg. The track can include a peg. The peg of the rotator can interface with the peg of the track causing the rotational kinematics on the rotator as the shackle system moves along the track.

In exemplary embodiments, the rotation of the rotating shackle can be caused, at least in part, by a motor configured to induce the rotational kinematics on the rotator.

In exemplary embodiments, the rotation of the rotating shackle can include a churning pattern wherein the rotator is configured to undergo alternating rotational kinematics causing the rotating shackle to rotate back and forth in a clockwise and counterclockwise direction.

In exemplary embodiments, the shackle system can include a stabilizing rod. The stabilizing rod can be configured to extend through a cavity of the product carried by the shackle system.

In exemplary embodiments, the stabilizing rod can be extendable and retractable.

In exemplary embodiments, the shackle system can include an external entrapment. The external entrapment can be configured to extend around at least a portion of the exterior of the product.

In exemplary embodiments, the external entrapment can be extendable and retractable.

In exemplary embodiments, the shackle system can include a brake. The brake can be configured to halt the rotation of the rotating shackle.

In exemplary embodiments, the product can be poultry.

In another exemplary embodiments, the present system can comprise a shackle system comprising a rotator and a rotating shackle, and a track, wherein the rotator is configured to undergo rotational kinematics causing rotation of the rotating shackle, and the rotation of the rotating shackle is caused, at least in part, by a motor configured to induce the rotational kinematics on the rotator.

In exemplary embodiments, the rotation of the rotating shackle is further caused, at least in part, by the track causing the rotational kinematics on the rotator as the shackle system moves along the track.

In exemplary embodiments, the rotator comprises a gear, the track comprises a rack, and the gear meshes with the rack causing the rotational kinematics on the rotator as the shackle system moves along the track.

In exemplary embodiments, the rotator comprises a rotator peg, the track comprises a track peg, and the rotator peg interfaces with the track peg causing the rotational kinematics on the rotator as the shackle system moves along the track.

In exemplary embodiments, the rotator is further configured to undergo alternating rotational kinematics causing rotation of the rotating shackle back and forth in a clockwise and counterclockwise direction.

In exemplary embodiments, the system can further comprise a stabilizing rod configured to extend through a cavity of a product carried by the shackle system, wherein the stabilizing rod is extendable and retractable.

In exemplary embodiments, the system can further comprise an external entrapment configured to extend around at least a portion of an exterior of a product carried by the shackle system, wherein the external entrapment is extendable and retractable.

In exemplary embodiments, the shackle system further comprises a trolley, wherein the trolley is coupled to the track and configured to undergo translational motion along the track causing the shackle system to move along the track, and wherein at least one of the rotator comprises a rotator peg, the track comprises a track peg, and the rotator peg interfaces with the track peg causing the rotational kinematics on the rotator as the shackle system moves along the track, the system further comprises a stabilizing rod configured to extend through a cavity of a product carried by the shackle system, wherein the stabilizing rod is extendable and retractable, or the system further comprises an external entrapment configured to extend around at least a portion of an exterior of a product carried by the shackle system, wherein the external entrapment is extendable and retractable.

In exemplary embodiments, the system is configured for rotating a product during processing.

In exemplary embodiments, the system further comprises a brake configured to halt the rotation of the rotating shackle.

In exemplary embodiments, the product is poultry.

In exemplary embodiments, the system further comprises a heat transfer media, wherein the system is further configured to transfer thermal energy between at least a portion of the product and the heat transfer media.

In exemplary embodiments, the heat transfer media is selected from a group consisting of cold air, chilled water, ice slurry, hot water, and a combination thereof.

In another exemplary embodiment, a system comprises a shackle system comprising a rotator comprising a rotator peg, and a rotating shackle; and a track comprising a track peg, wherein the rotator peg interfaces with the track peg causing the rotator to undergo rotational kinematics as the shackle system moves along the track causing rotation of the rotating shackle.

The disclosed technology also includes a method for processing a product.

The method can include attaching the product to a shackle system wherein the shackle system is coupled to a track. The method can include moving the product, with the shackle system, along the track. The method can include rotating the product, with the shackle system.

In exemplary embodiments, the shackle system can include a trolley, a rotator, and a rotating shackle.

In exemplary embodiments, the method can include causing, at least in part by the track, rotational kinematics on the rotator as the shackle system moves along the track.

In exemplary embodiments, the rotator can include a gear. The track can include a rack. The gear can mesh with the rack causing rotational kinematics on the rotator as the shackle system moves along the track.

In exemplary embodiments, the rotator can include a peg. The track can include a peg. The peg of the rotator can interface with the peg of the track causing rotational kinematics on the rotator as the shackle system moves along the track.

In exemplary embodiments, the method can include causing, at least in part by a motor, rotational kinematics on the rotator.

In exemplary embodiments, the rotation of the rotating shackle can include a churning pattern wherein the rotator is configured to undergo alternating rotational kinematics causing the rotating shackle to rotate back and forth in a clockwise and counterclockwise direction.

In exemplary embodiments, the method can include halting, with a brake, the rotation of the rotating shackle.

In exemplary embodiments, the method can include holding in place, with a brake, the orientation of the product on the shackle system.

In exemplary embodiments, the shackle system further can include a stabilizing rod. The method can include extending, through a cavity of the product, the stabilizing rod. The method can include retracting, through the cavity of the product, the stabilizing rod.

In exemplary embodiments, the shackle system can include an external entrapment. The method can include extending, around at least a portion of the exterior of the product, the external entrapment. The method can include retracting the external entrapment.

In exemplary embodiments, the method can include exposing at least a portion of the product to a heat transfer media, such that heat transfer occurs between the product and the heat transfer media.

In exemplary embodiments, the heat transfer media can be cold air.

In exemplary embodiments, the heat transfer media can be chilled water.

In exemplary embodiments, the heat transfer media can be ice slurry.

In exemplary embodiments, the heat transfer media can be hot water.

In exemplary embodiments, the processing can include primary and secondary processing of the product.

The product can be poultry.

In another exemplary embodiment, a method for processing a product with an exemplary embodiment of the system can comprise attaching the product to the shackle system coupled to the track, moving the product, with the shackle system, along the track, and rotating the product at least in part by the motor.

In exemplary embodiments, the method further comprises rotating the product at least in part by the track causing the rotational kinematics on the rotator as the shackle system moves along the track, and transferring thermal energy between at least a portion of the product and a heat transfer media.

In exemplary embodiments, the rotator comprises a gear, the track comprises a rack, and rotating the product, at least in part by the track, comprises meshing the gear with the rack.

In exemplary embodiments, the rotator comprises a rotator peg, the track comprises a track peg, and rotating the product, at least in part by the track, comprises interfacing the rotator peg with the rack peg.

In exemplary embodiments, the rotator is further configured to undergo alternating rotational kinematics causing rotation of the rotating shackle back and forth in a clockwise and counterclockwise direction.

In exemplary embodiments, the method can further comprise halting, with a brake, the rotation of the rotating shackle.

In exemplary embodiments, the method can further comprise holding in place, with a brake, an orientation of the product on the shackle system.

In exemplary embodiments, the method can further comprise extending, through a cavity of the product, a stabilizing rod of the shackle system, and retracting, through the cavity of the product, the stabilizing rod.

In exemplary embodiments, the method can further comprise extending, around at least a portion of an exterior of the product, an external entrapment of the shackle system, and retracting the external entrapment.

In exemplary embodiments, the heat transfer media is selected from a group consisting of cold air, chilled water, ice slurry, hot water, and a combination thereof.

In another exemplary embodiment, a method for processing a product with a system comprising a shackle system coupled to a track, the shackle system comprising a rotator, a rotating shackle, and a stabilizing rod, wherein the rotator is configured to undergo rotational kinematics causing rotation of the rotating shackle, the method comprises extending, through a cavity of the product, the stabilizing rod of the shackle system to attach the product to the shackle system, moving the product, with the shackle system, along the track, rotating the product with the shackle system, and retracting, through the cavity of the product, the stabilizing rod.

In another exemplary embodiment, a method for processing a product with a system comprising a shackle system coupled to a track, the shackle system comprising a rotator, a rotating shackle, and an external entrapment, wherein the rotator is configured to undergo rotational kinematics causing rotation of the rotating shackle, the method comprises extending, around at least a portion of an exterior of the product, the external entrapment of the shackle system, moving the product, with the shackle system, along the track, rotating the product with the shackle system, and retracting the external entrapment.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein. Further, while one or more embodiments may be discussed as having certain advantageous features, one or more of such features can also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

FIG. 2B provides a rotating shackle, in accordance with the present disclosure.

FIG. 2C provides a rotating shackle, in accordance with the present disclosure.

DETAILED DESCRIPTION

Figure 1:
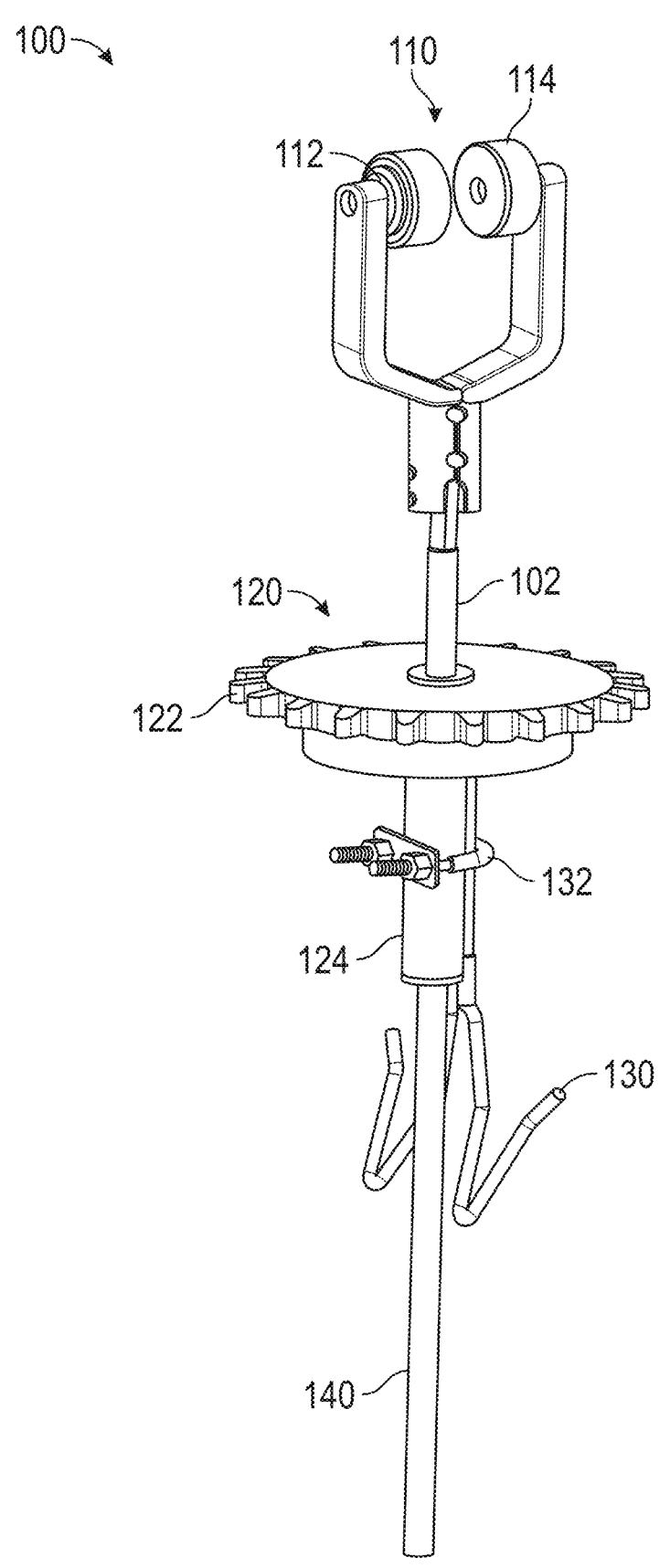
FIG. 1 provides a rotating shackle, in accordance with the present disclosure.

Throughout this disclosure we describe systems and methods for processing, such as, a system and method for rotating a product during processing. For example, an embodiment of the disclosure provides a rotating shackle system for enhanced inline poultry processing.

While the disclosed technology is described throughout this disclosure in relation to systems and methods for processing poultry, those having skill in the art will recognize that the disclosed technology is not so limited and can be applicable to other scenarios and applications. For example, it is contemplated that the disclosed technology can be applicable to other food processing applications such as pork, beef, and other livestock.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Indeed, it is to be understood that other examples are contemplated. Many suitable components that would perform the same or similar functions as components described herein are intended to be embraced within the scope of the disclosed devices and methods. Such other components not described herein may include, but are not limited to, for example, components developed after development of the disclosed technology.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified. Further, it is contemplated that the disclosed methods and processes can include, but do not necessarily include, all steps discussed herein. That is, methods and processes in accordance with the disclosed technology can include some of the disclosed while omitting others.

Throughout the specification and the claims, the following terms take at least the meanings explicitly associated herein, unless otherwise indicated. The term "or" is intended to mean an inclusive "or." Further, the terms "a," "an," and "the" are intended to mean one or more unless specified otherwise or clear from the context to be directed to a singular form. By "comprising," "containing," or "including" it is meant that at least the named element, or method step is present in article or method, but does not exclude the presence of other elements or method steps, even if the other such elements or method steps have the same function as what is named.

As used herein, unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Although the disclosed technology may be described herein with respect to various systems and methods, it is contemplated that embodiments or implementations of the disclosed technology with identical or substantially similar features may alternatively be implemented as methods or systems. For example, any aspects, elements, features, or the like described herein with respect to a method can be equally attributable to a system. As another example, any aspects, elements, features, or the like described herein with respect to a system can be equally attributable to a method.

Reference will now be made in detail to examples of the disclosed technology, examples of which are illustrated in the accompanying drawings and disclosed herein. Wherever convenient, the same reference numbers will be used throughout the drawings to refer to the same or like parts.

Referring now to the drawings, in which like numerals represent like elements, examples of the present disclosure are herein described. As will be described in greater detail, the present disclosure can include a system and method for rotating products during processing. To provide a background of the system described in the present disclosure, components of the system for rotating products during processing is shown in FIG. 1 and will be discussed first.

To facilitate an understanding of the principles and features of the present disclosure, various examples of the disclosed technology are explained herein. The components, steps, and materials described herein as making up various elements of the disclosed technology are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

As shown in FIG. 1, the disclosed technology includes a shackle system 100 for rotating products during processing. The shackle system 100 can include a body 102. For example, the body 102 can be a slender rod or tube. The shackle system 100 can include a trolley 110. For example, the trolley 110 can be disposed at a proximal end of the body 102 and can be configured to engage or couple with the track of a processing line. Alternatively, or in addition, the shackle system 100 can include a rotator 120 configured to rotate a product attached to the rotating shackle. For example, the rotator 120 can include a gear 122 and a rotatable cylinder 124. Alternatively, or in addition, the shackle system 100 can include a rotating shackle 130. For example, the rotating shackle 130 can be configured to receive and hold a product for processing (e.g., a poultry carcass). Alternatively, or in addition, the shackle system 100 can include a stabilizing rod 140. For example, the stabilizing rod 140 can be disposed at a distal end of the body 102 and can extend through the product to keep the product center of mass aligned with the vertical axis of the shackle assembly.

The trolley 110 can include one or more wheels configured to move the shackle system 100 along a track of a processing line. For example, the trolley 110 can include a first wheel 112 and a second wheel 114 configured to engage the track of a processing line wherein the wheels are disposed on the top of the track allowing the rotating shackle to hang from the track. Alternatively, or in addition, the trolley 110 can include any movement structure known in the art, including, but not limited to wheels, bearings, sliders, gears, tracks, and the like, or any combination thereof. The trolley 110 can be securely attached to the proximate end of the body 102. Alternatively, or in addition, the trolley 110 can be moveably attached to the proximate end of the body 102. For example, the trolley 110 can attach to the body 102 with a hinge to allow the body 102 to freely swing. Alternatively, the trolley 110 can be removably attached to the proximate end of the body 102.

The rotator 120 can be configured to rotate the rotating shackle 130 as the shackle system 100 moves along a processing track. For example, the rotator 120 can undergo rotational kinematics when the shackle system 100 undergoes translational motion along the track. The rotator can include a gear 122 configured to mesh with teeth along a processing track wherein the teeth of the track induce rotation on the gear 122 as the shackle system 100 moves along the track. Alternatively, or in addition, the rotator 120 can include any rotator known in the art, including, but not limited to a gear, sprocket, pulley, pinion, wheel, peg, and the like, or any combination thereof, wherein a structure of the track induces rotation on the rotator 120 as the shackle system 100 moves along the track. Alternatively, or in addition, the rotator 120 can include an actuator configured to actively rotate the rotating shackle 130. For example, the rotator can include a motor configured to controllably rotate, hold, and position the rotating shackle 130.

The rotatable cylinder 124 can be a hollow cylinder with an interior configured to fit the body 102 of the shackle system 100. In addition, the rotatable cylinder 124 can include bearings on the interior to allow for free rotation around the body 102 passing through.

The rotating shackle 130 can be any shackle known in the art, including, but not limited to a shackle hook, slip hook, evisceration shackle, meat hook, poultry shackle, pork shackle, beef shackle, or any other type of livestock shackle or hook, and the like, or any combination thereof. The rotating shackle 130 can be attached to rotator 120 with a fastener 132. For example, as illustrated in FIG. 1, the rotating shackle 130 can be attached to the rotatable cylinder 124 with a mounting plate and U-bolt for a secure attachment.

The stabilizing rod 140 can be any elongated member that provides additional mass in line with the vertical axis of the rotating shackle. For example, a metal rod. In addition, the stabilizing rod 140 can be extendable and retractable. For example, the stabilizing rod 140 can be retracted to allow for a product to be placed on or removed from rotating shackle 130 and can be extended, through the cavity of the product, once the product is in place on the rotating shackle 130. Alternatively, or in addition, the stabilizing rod can be an extension of the body 102. For example, the body 102 can extend from the trolley 110 attached to the proximal end of the body 102, through the rotator 120, and down through the product.

Figure 2A:
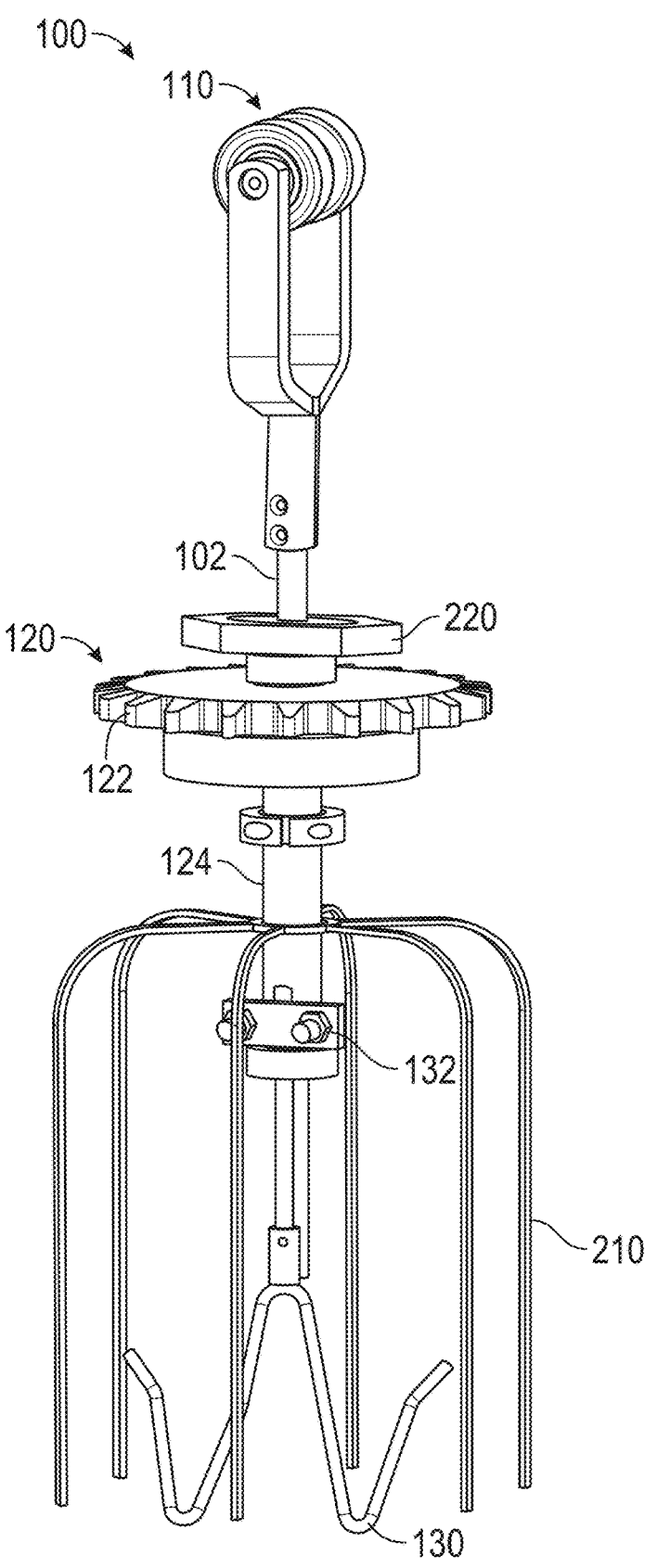
FIG. 2A provides a rotating shackle, in accordance with the present disclosure.

As shown in FIGS. 2A-C, the rotating shackle can include an external structure. For example, when a product does not have a cavity, such as a cavity of a poultry carcass, the rotating shackle can include an external structure, alternatively, or in addition to, a stabilizing rod. The external structure can be an external entrapment 210. For example, the external entrapment 210 can include one or more structures disposed at a distal end of the body 102 configured to be positioned around the exterior of the product to help keep the product center of mass aligned with the vertical axis of the shackle assembly. The external entrapment 210 can comprise a plurality of rods extending down around the exterior of the product. For example, the plurality of rods can generally form a cage around the product holding the product in place. Alternatively, or in addition, the rods can be flexible to accommodate products with varying sizes. In addition, the external entrapment 210 can be extendable and retractable.

As illustrated in FIG. 2B, the external entrapment can be extended to an engaged position 230. For example, the external entrapment 210 can be extended down around the exterior of the product. In addition, as illustrated in FIG. 2C, the external entrapment can be retracted to a retracted position 240. For example, the external entrapment 210 can be retracted up away from the product to allow the product to be placed onto or removed from the rotating shackle 130.

Alternatively, or in addition, the shackle system 100 can include a brake 220. The brake 220 can be configured to stop or prevent rotation of the rotating shackle. Additionally, the brake can be configured to hold the rotating shackle in one or more distinct positions or orientations. For example, the brake can hold the rotating shackle in a position for cutting the product.

Figure 3:
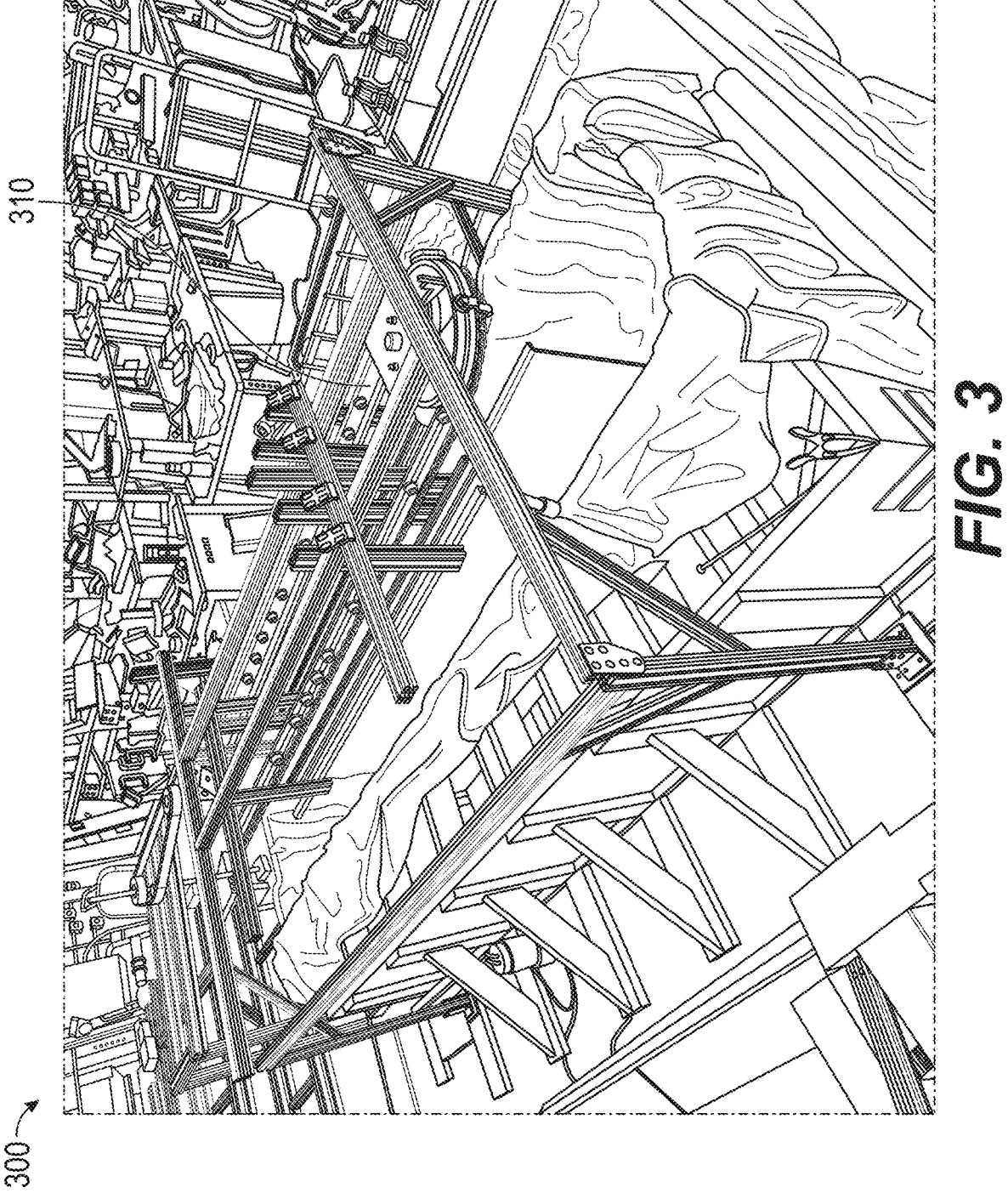
FIG. 3 provides photos of an example system for rotating a product during processing, in accordance with the present disclosure.

As shown in FIG. 3, the disclosed technology can include a processing system 300. The processing system 300 can include a track 310. For example, the track 310 can include an overhead track wherein one or more shackle systems 100 hang from the overhead track and can move along the overhead track. The track 310 can be a continuous track that spans the entire processing process. For example, the track 310 can be continuous through the primary and secondary processing (e.g., slicing, separating, cutting) of the product. Alternatively, or in addition, the track 310 can span a portion of the processing process.

Figure 4:
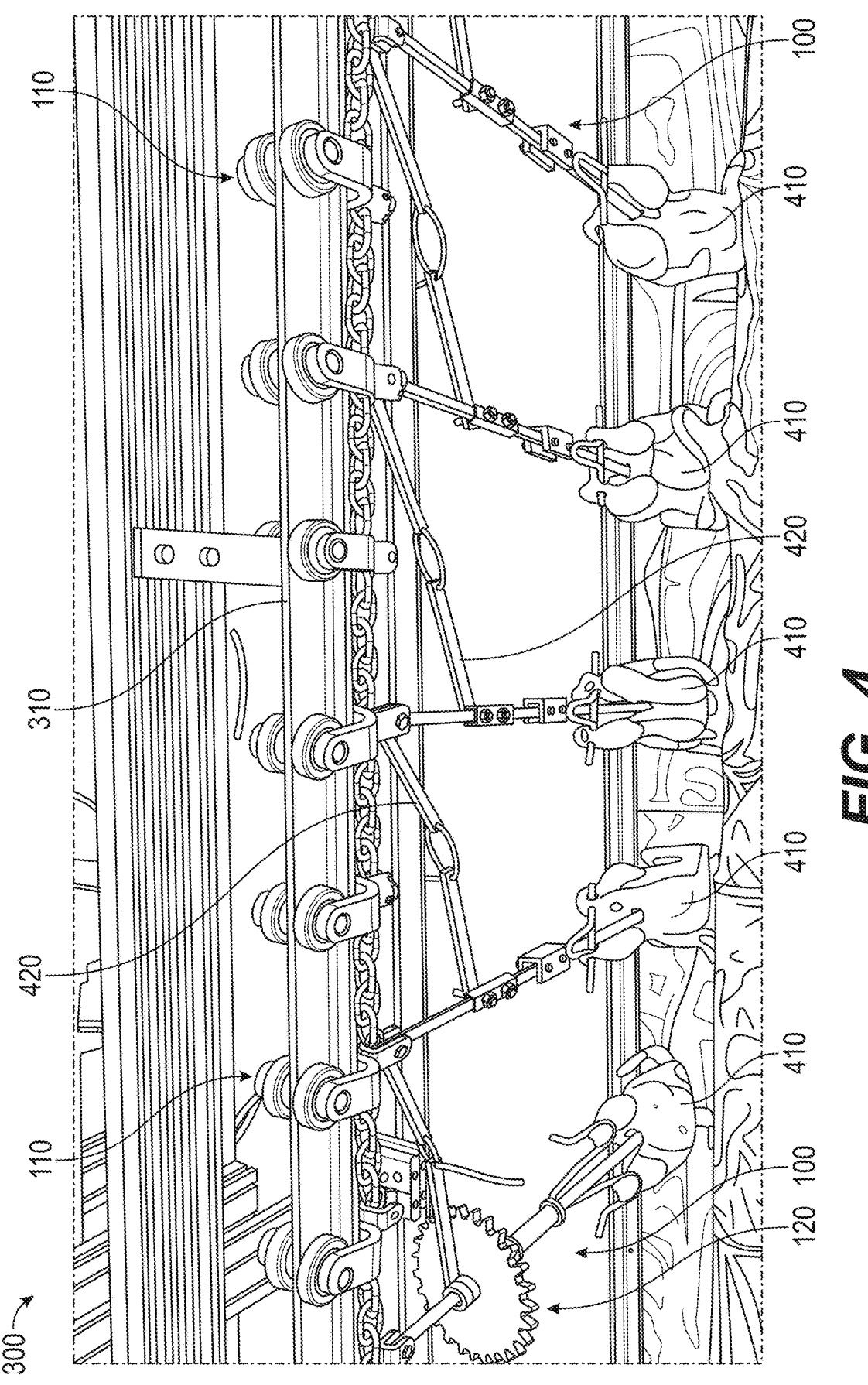
FIG. 4 provides photos of an example system for rotating a product during processing, in accordance with the present disclosure.

As shown in FIG. 4, the processing system 300 can include a plurality of shackle systems 100. The shackle system 100 can hold a product 410. For example, as illustrated in in FIG. 4, the product 410 can be a poultry carcass.

As show in FIG. 4, the shackle system 100 can be coupled to the track 310 by the trolley 110. The trolley system 110 can roll along the track causing translation motion of the shackle system 100.

Alternatively, or in addition, as shown in FIG. 4, the processing system 300 can include one or more links 420 between shackle systems 100. The links 410 can assist the product 410 in keeping near-vertical orientation. For example, the links 420 can provide force to hold the product in place vertically and counteract any drag effect caused by the chilling medium. Alternatively, or in addition, the links 420 can translate rotational motion from a shackle system 100 to an adjacent shackle system 100. For example, the links 420 can translate rotational motion from a shackle system 100 with a rotator 120 to an adjacent shackle system 100.

Figure 5:
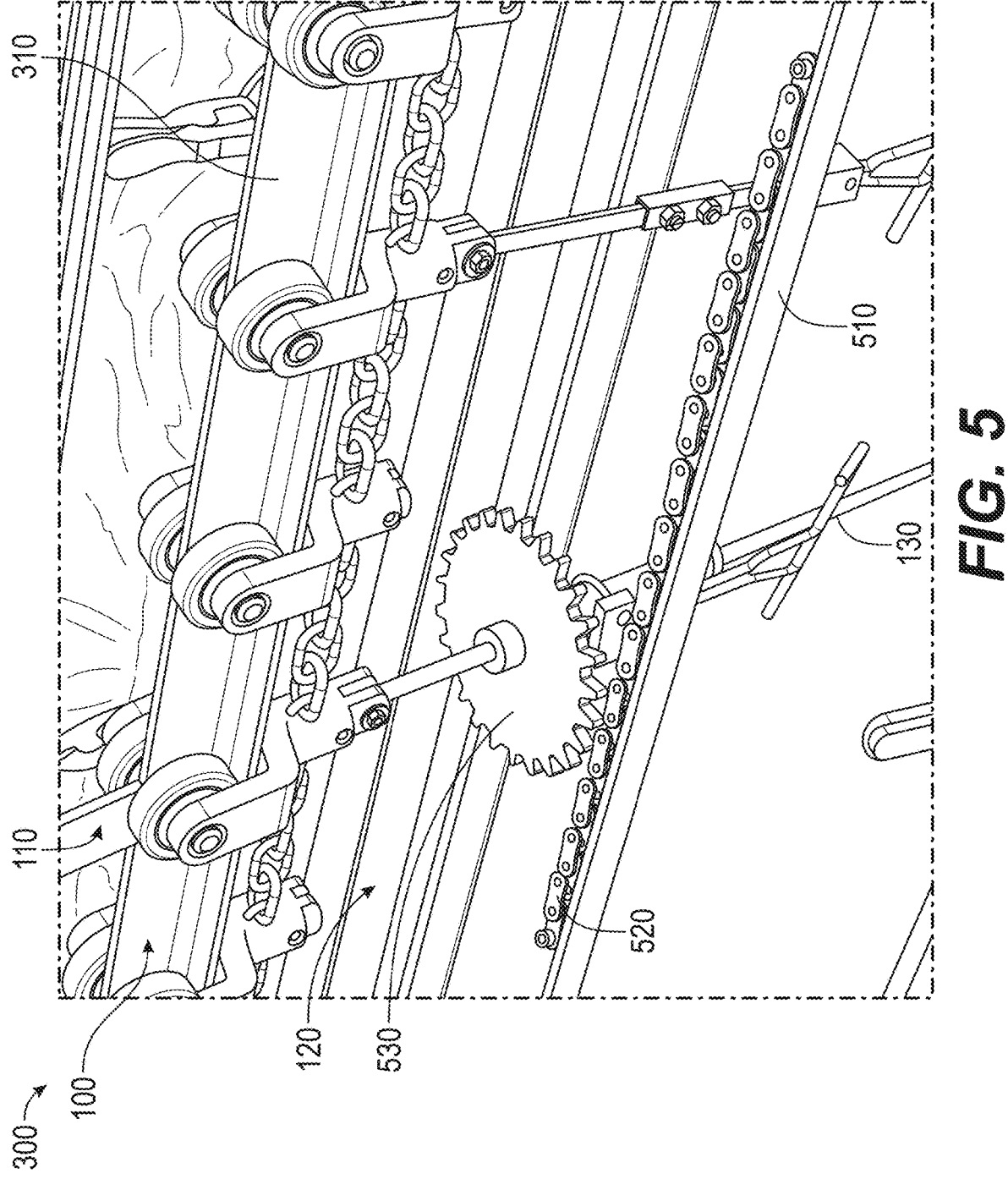
FIG. 5 provides photos of an example system for rotating a product during processing, in accordance with the present disclosure.

As shown in FIG. 5, the processing system 300 can include one or more secondary tracks 510. For example, the secondary track 510 can be a side track disposed at a height such that it interacts with the rotator 120. Alternatively, or in addition, the secondary track 510 can be disposed in line with the track 310 or can run parallel with the track 310. The secondary track 510 can include one or more structures that interact with the rotator 120 and cause rotation of the rotator 120 as the shackle system 100 moves along the track. For example, as illustrated in FIG. 5, the secondary track 510 can include a chain 520 and the rotator 120 can include a sprocket 530. As the shackle system 100, via the trolley 110, moves along the track 310, the chain 520 can mesh with the sprocket 530 causing rotation of the rotator 120 and rotating shackle 130.

Figure 6:
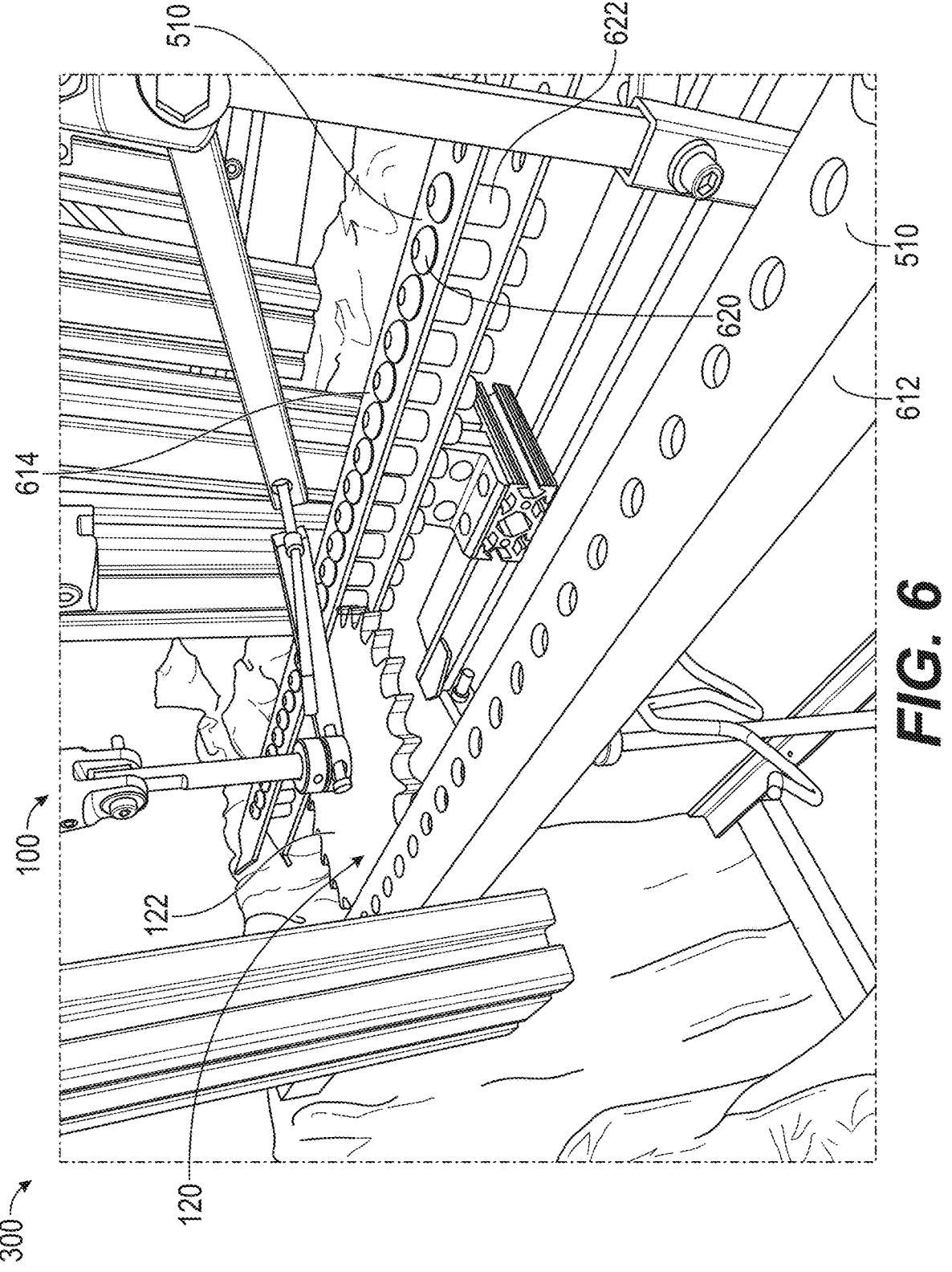
FIG. 6 provides photos of an example system for rotating a product during processing, in accordance with the present disclosure.

As shown in FIG. 6, the secondary track 510 can include a first side track 612 and a second side track 614. The first and second side tracks 612 and 614 can be disposed on either side of the shackle system 100. The first and second side tracks 612 and 614 can be disposed at a height such that they interacts with the rotator 120. The first and second side tracks 612 and 614 can include one or more structures that interact with the rotator 120 and cause rotation of the rotator 120 as the shackle system 100 moves along the track. For example, as illustrated in FIG. 6, the second side track 614 can include a rack 620 and the rotator 120 can include a gear 122. As the shackle system 100, via the trolley 110, moves along the track, the rack 620 can mesh with the gear 122 causing rotation of the rotator 120. The rack 620 can include a plurality of pins 622. For example, the pins 622 can be sized and spaced to allow for the gear 122, to mesh. Alternatively, or in addition, the first side track 612 can include a rack.

Figure 7:
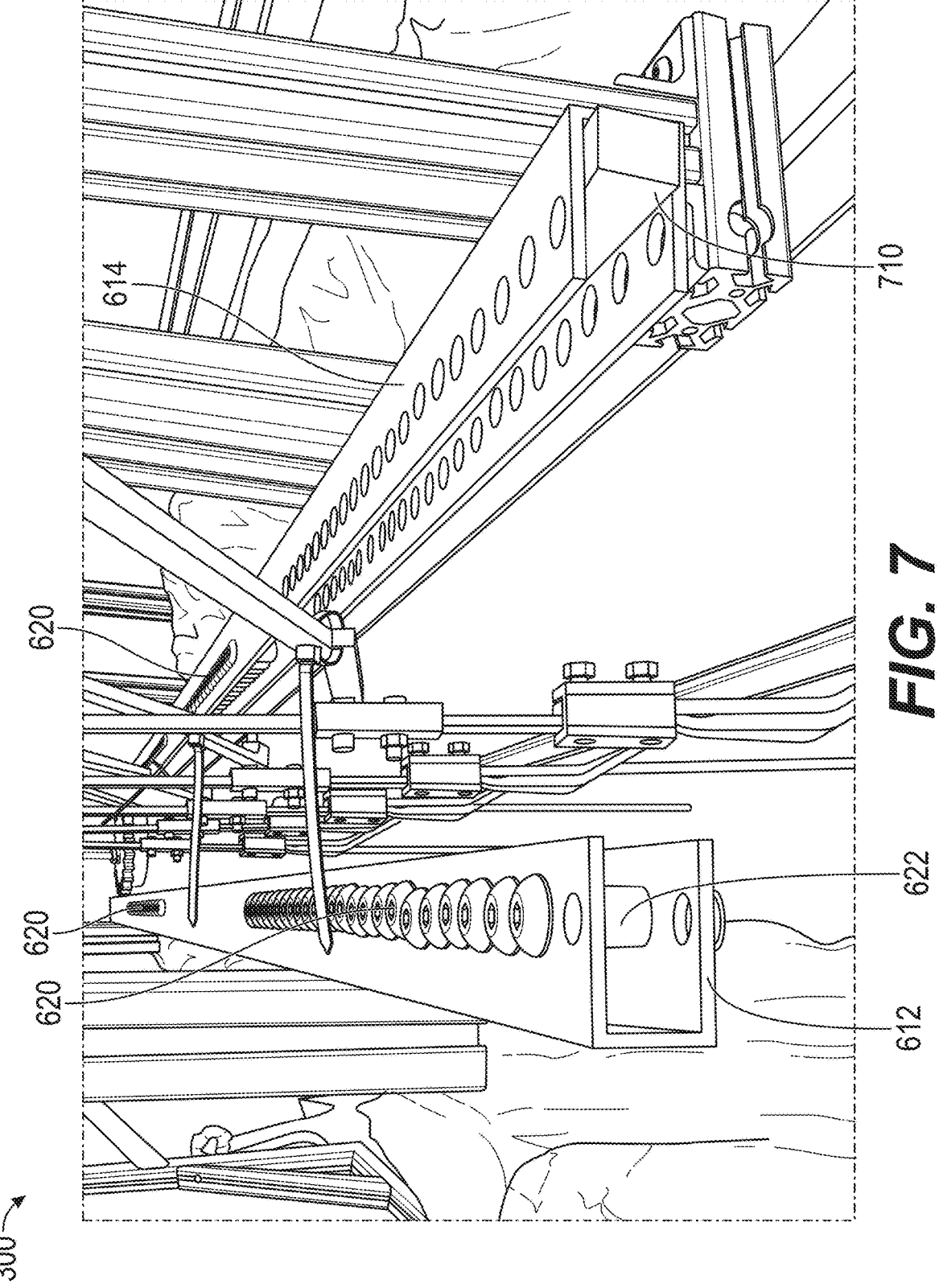
FIG. 7 provides photos of an example system for rotating a product during processing, in accordance with the present disclosure.

As shown in FIG. 7, the first side track 612 and the second side track 614 can include alternating sections of rack 620. The sections of rack 620 can comprise a plurality of pins 622. In addition, the first side track 612 and the second side track 614 can include alternating sections of blank 710. For example, blank 710 can be a solid material block such as ultra-high molecular-weight polyethylene. The blank 710 can be located in areas where there are no pins 622 to allow for proper gear meshing on the opposite side where there are pins 622. For example, as illustrated in FIG. 7, the first side track 612 and second side track 614 can include alternating sections of rack 620 and blank 710 wherein the sections of rack 620 of the first side track 612 align with the sections of blank 710 of the second side track 614 and vice versa.

Figure 8A:
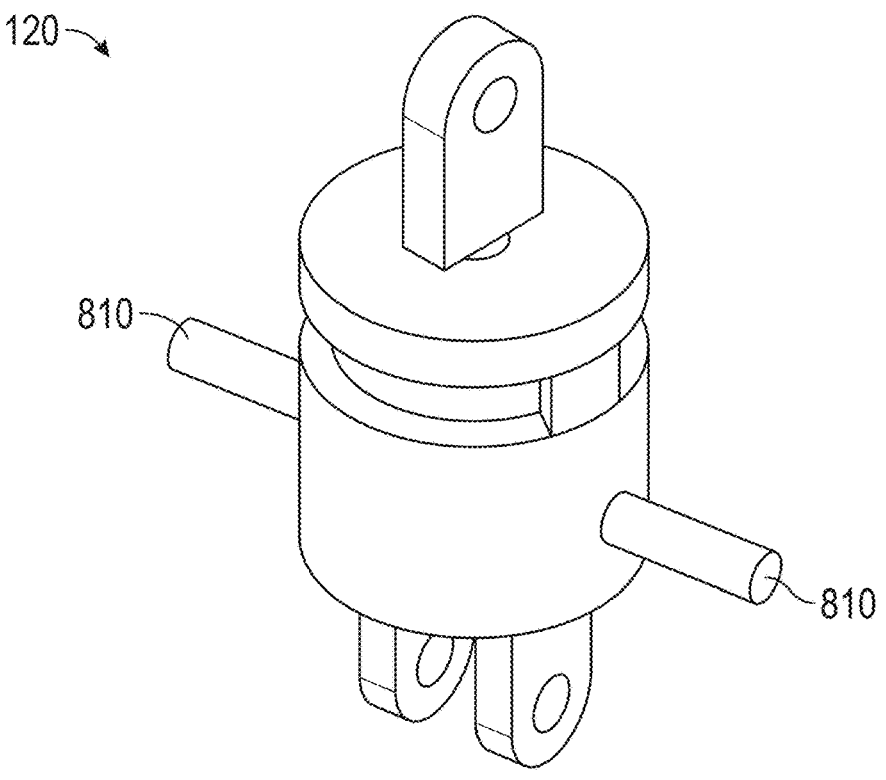
FIG. 8A provides a component of a rotating shackle, in accordance with the present disclosure.
Figure 8B:
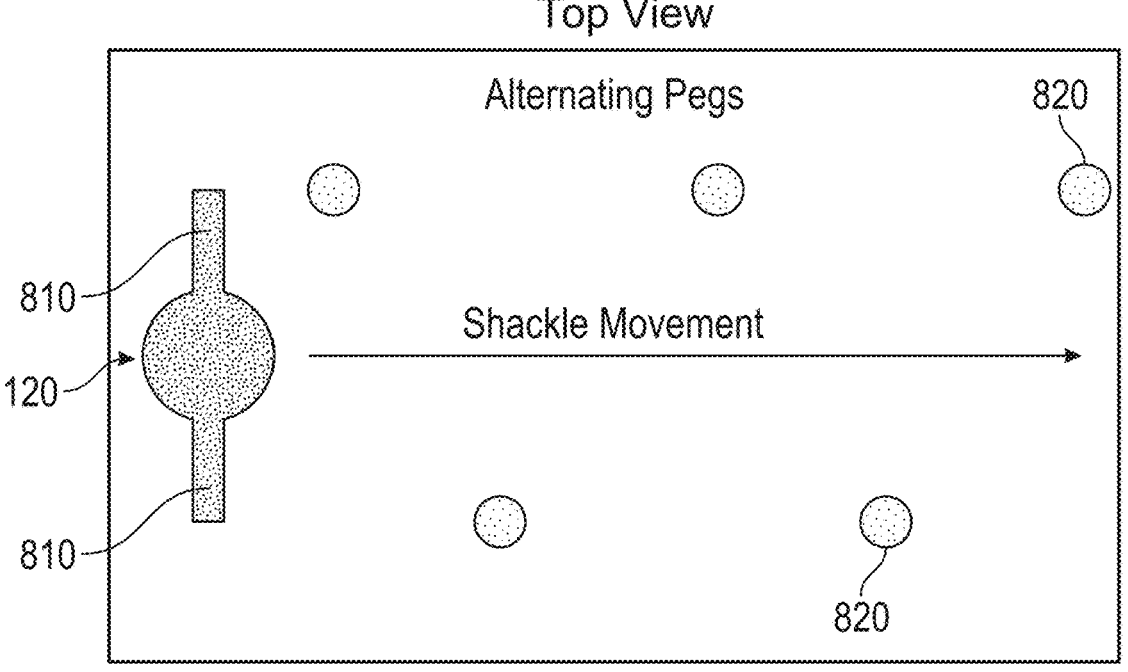
FIG. 8B provides an illustration of an example system for rotating a product during processing, in accordance with the present disclosure.

Alternatively, or in addition, as shown in FIG. 8A, the rotator 120 can include one or more pegs 810. Alternatively, or in addition, the secondary track 510 include one or more track pegs 820. As illustrated in FIG. 8B, the track pegs 820 can interact (e.g., interface, contact) with the pegs 810 of the rotator 120 and cause rotation of the rotator 120 as the shackle system 100 moves along the track.

Alternatively, or in addition, the secondary track 510 and the rotator 120 can include any structures or systems known in the art to cause rotational motion, including but not limited to, gears, wheels, rack and pinion, pegs, chain and sprocket, and the like, or any combination thereof. Alternatively, or in addition, the rotating shackle 130 can be rotated by any movement method known in the art, including but not limited to, direct drive, pneumatic, hydraulic, serial manipulator, cable drive, gears, wheels, pulleys, rack and pinion, pegs, chain and sprocket, and the like, or any combination thereof. The rotation of the rotating shackle 130 can be independent of the translational movement of the shackle system 100 along the track 310.

Figure 9:
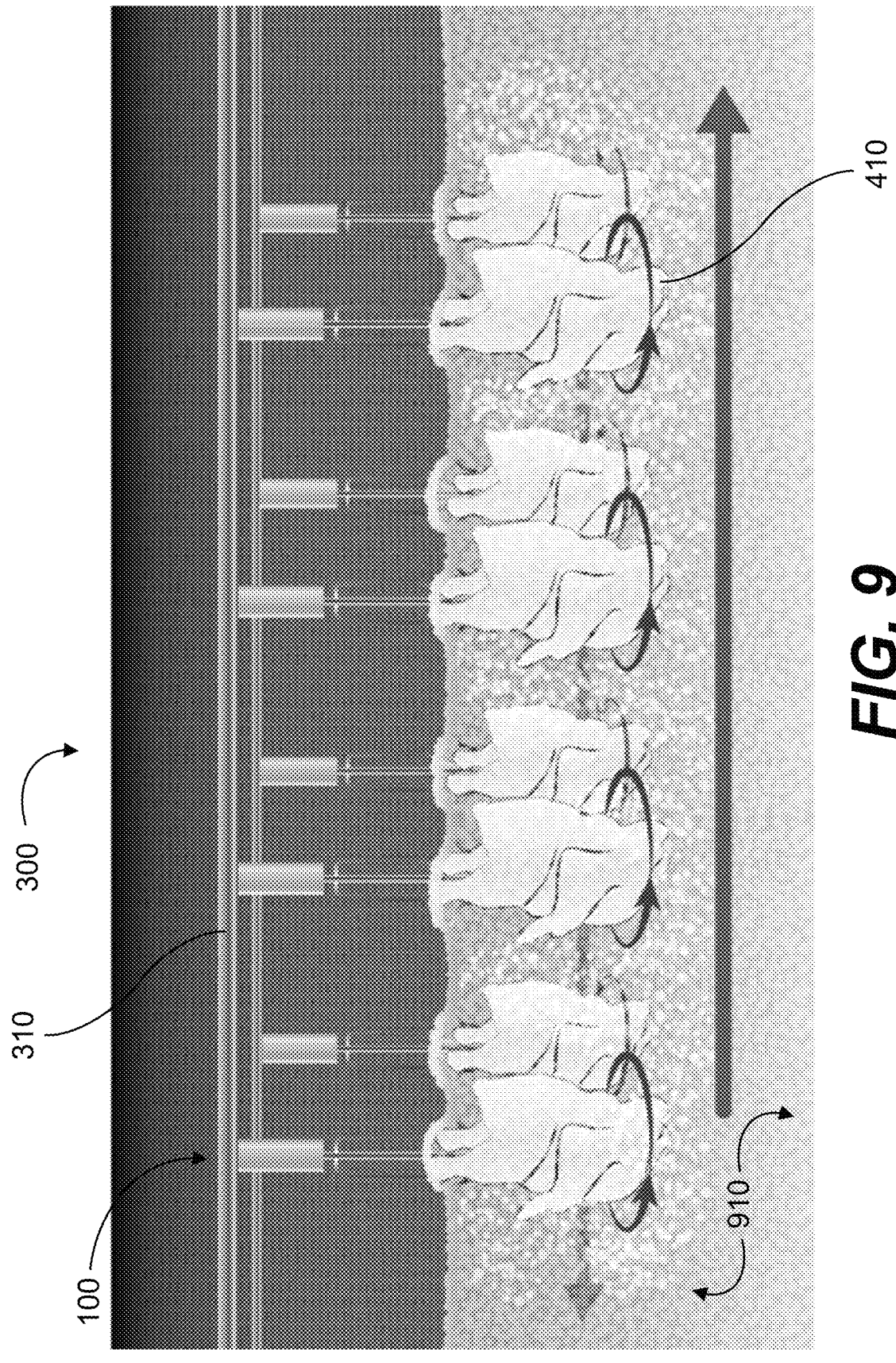
FIG. 9 provides an illustration of an example system for rotating a product during processing, in accordance with the present disclosure.
Figure 10:
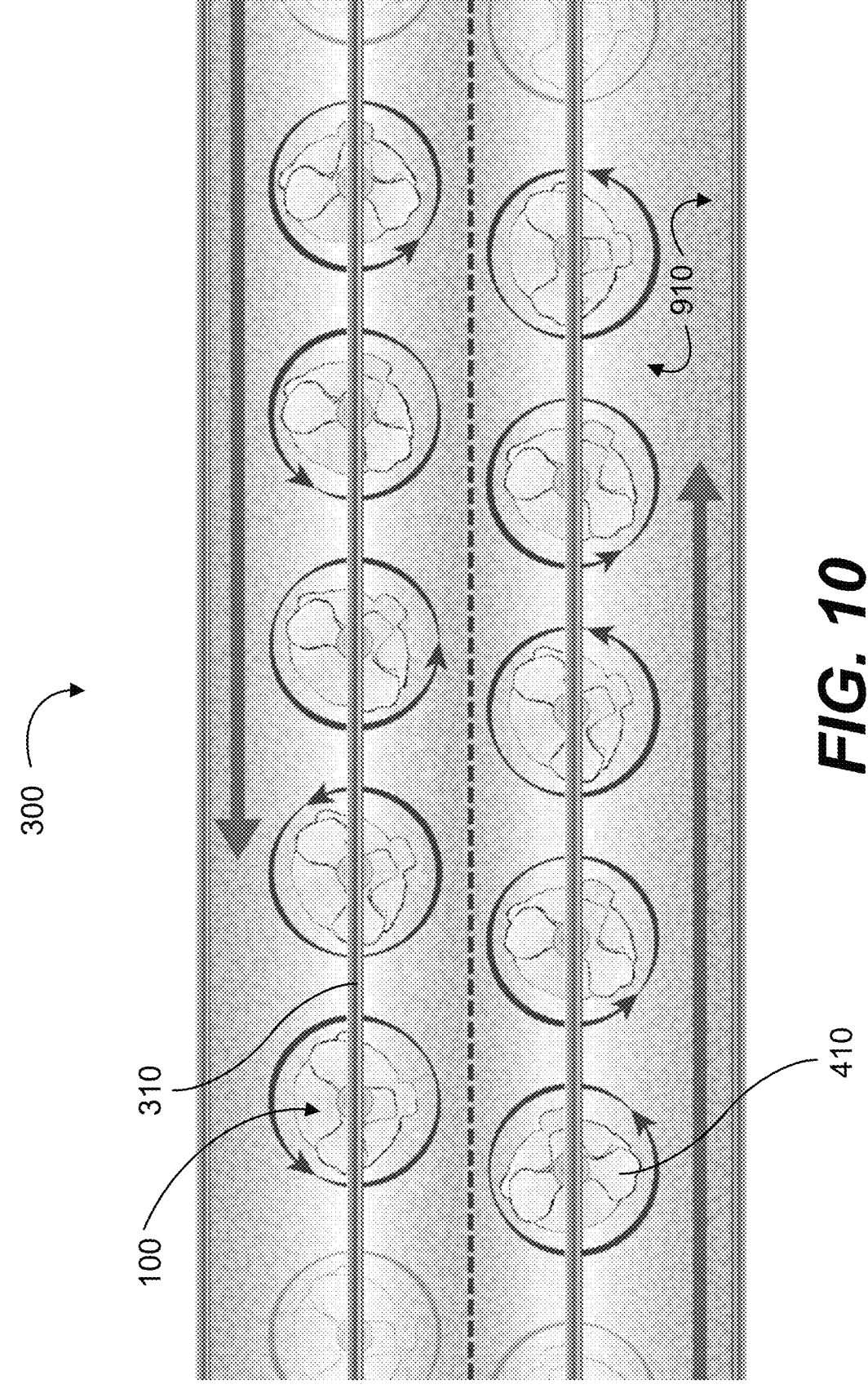
FIG. 10 provides an illustration of an example system for rotating a product during processing, in accordance with the present disclosure.

As shown in FIGS. 9 and 10, the processing system 300 can include moving and rotating a plurality of products 410 through a heat transfer media 910. The rotational pattern of the products 410 through the heat transfer media 910 can allow better control and enhanced transport phenomena between the product 410 and heat transfer media 910. The heat transfer media 910 can be any medium with a temperature differential to the product 410. The heat transfer media 910 can include a chilled media for chilling the products 410. For example, the heat transfer media 910 can include chilled air, chilled water, ice slurry, and the like, or any combination thereof. Alternatively, or in addition, the heat transfer media 910 can include a heated media for heating the products 410. For example, hot water for scalding the products 410.

The rotational pattern can be a churning pattern, wherein the product 410 counter-rotates before completing a revolution. Alternately, or in addition, the rotational pattern can include consistent single direction rotation (e.g., clockwise or counterclockwise), as illustrated in FIGS. 9 and 10. Alternately, or in addition, the rotational pattern can include single direction rotation with intermittent stops in rotation.

The processing system 300 can include a pattern wherein the product 410 passes through the heat transfer media 910 one or more times. For example, as illustrated in FIGS. 9 and 10, the products 410 can pass through the heat transfer media 910 in a first direction and then back through the heat transfer media 910 in a second direction. The first direction can be generally opposite to the second direction.

The following examples further illustrate aspects of the present disclosure. However, they are in no way a limitation of the teachings or disclosure of the present disclosure as set forth herein.

EXAMPLES

In one embodiment, the invention includes a poultry carcass conveyor system that includes rotating carcass shackles that cause poultry carcasses to rotate about a vertical axis while the carcasses are in a chiller medium, such as water. The rotating shackles are attached to a conveyor that passes the carcasses through the chiller medium. Rotation of the carcasses results in quicker and more uniform internal cooling of each carcass.

Optimizing the rotational carcass kinematic (i.e., that is superimposed upon the default translational kinematic) is an important sensitivity. As a leading example, "churning" patterns, wherein carcasses counter-rotate before completing a revolution, have generally been found to be more beneficial to chilling than rotational patterns wherein carcasses rotate multiple revolutions before changing direction. Various factors contribute to this added enhancement via churning, such as more intense boundary layer disruption.

Optimally rotating shackles are projected to allow better control and enhanced transport phenomena between the poultry carcasses and chiller media (e.g., chilled water, ice slurry). Rotating shackles can further allow increased mass transfer (e.g., water intake into the product) during processing. Inline approaches already have key food safety features such as (1) reduced/precluded cross-contamination via carcasses not coming into mutual contact and greater traceability opportunities; (2) Rotating shackles provide an additional and controlled contribution to relative velocity between the carcasses and chiller medium. This then means that key convective heat transfer parameters such as Nusselt number are not limited by line speed (e.g., 140 birds per minute), because rotational vectors offer another kinematic degree-of-freedom; (3) Optimized rotational patterns by preceding carcasses may reduce wake effects seen by trailing carcasses, hence allowing for better uniformity of chill of the sequence of carcasses; (4) Specific to the ice slurry, issues of variations in carcasses exposure to ice (e.g., due to ice stratification and variable path lines of unconstrained carcasses) is addressed via consistent carcass depths and pathways within the chiller medium; (5) Specific to the ice slurry, rotating carcasses may serve as "agitators" to help mechanically reduce agglomeration as opposed to having complete dependence upon a freezing point depressant/dispersing agent such as a salt.

Another example includes a practical shackle carousel system with induced active and passive-mechanical shackle rotation. Passive shackle rotational systems include shackle rotation that is coupled with the processing line speed. The applications of this rotational shackle system can be integrated throughout the poultry processing plant including first and secondary processing to improve productivity. Furthermore, at the end of rotation, the rotating shackle can be held in desired orientation by brake or locking the system. Active methods of inducing shackle rotation that are decoupled from the processing line speed that rotate independent of processing line translation (i.e., motor-driven pulley, electronic shackle control) can be implemented in a similar manner as shown.

Rotating Shackle System Proof-of-Concept Development

Significant time and effort was put in to building a practical shackle carousel system with induced active and passive-mechanical shackle rotation. Active methods of inducing shackle rotation that are decoupled from the processing line speed that rotate independent of processing line translation (i.e., motor-driven pulley, electronic shackle control) can be implemented in a similar manner as disclosed. Passive shackle rotational systems include shackle rotation that is coupled with the processing line speed. The applications of this rotational shackle system can be integrated throughout the poultry processing plant including first and secondary processing to improve productivity. Furthermore, at the end of rotation, the rotating shackle can be held in desired orientation by brake or locking the system.

Carousel Test Rig Subsystem

FIG. 3 displays the entire shackle carousel system and FIG. 4 displays a portion of the carousel shackle line. The carousel track is 280.1 inches (~23.3 ft) in total length with two straight track lengths of 111 inches and two half-circle bends with diameters of 18.5 inches each. The test rig capacity was modified to hold a maximum capacity of 593.8 gallons chiller media with a width of 36 inches, length of 161 inches, and a height of 24 inches. The test rig was modified in this manner to accommodate the standard, industrial 18.5-inch diameter pulleys and allow for the shackle line to be moving within the center of the channel at all times. The shackle carousel line is driven by a 1 HP SEW EuroDrive motor and motor VFD controller used in conjunction with a timing belt that is coupled to the driver pulley. The driver pulley has notches where the shackle trolleys (linked by Grade 30 chain and spaced 12 inches apart) fall into place and are transported around the carousel track.

With the motor VFD control, the carousel line speed can be varied up to 3.3 ft/s. Based upon typical industrial processing speeds of 130-140 birds per minute (which translates to a high end speed of 2.2-2.3 ft./s), there is more than enough motor power to drive the system.

Modified Rotational Shackle Subsystem

In lieu of the motorized shackle that is programmed to rotate in a certain manner or similar translation-independent rotation method, a mechanical rotational shackle assembly, displayed in FIG. 1, was designed and constructed as one proof-of-concept method for implementing passively-induced shackle rotation. The modified assembly implements additional rotational shackle kinematics to the traditional translational shackle motion by way of the pinion gear. In this assembly, the pinion gear can be varied in size depending on the desired shackle RPM for a fixed line speed. The diameter of the pinion gear in the current proof-of-concept is 6.4 inches, which corresponds to shackle RPMs of 70-75 RPM based upon industrial translation line speeds of 2.0-2.2 ft./s. As mentioned, the relationship between shackle angular velocity and translational velocity is fixed due to the pinion gear sizing, but it can be varied with replacement by a smaller/larger gear. Another feature of the rotational shackle assembly is the method of holding the chicken in place with a stabilizing rod that extends beyond the shackle when the chicken has a middle cavity. This helps the system to keep the carcass center of mass in line with the shackle center axis as it rotates back and forth. Without this stabilization, the carcass's rotational inertia may displace it from the central shackle axis and can cause the carcass to fall off the shackle. A chicken with a cavity can be held in place with a stabilizing center rod that extends beyond the shackle. For other processing steps, in which the chicken does not have a cavity, the chicken can be held stable with an exterior entrapment, and one proof-of-concept design can be seen in FIGS. 2A-C. In certain steps of processing, shackle orientation is critical to process efficacy so methods for maintaining proper shackle orientation have been devised. Shackle rotation brake, lock, or pin extension methods to trigger a stop can be implemented, and one proof-of-concept design can be seen in FIGS. 2A-C.

Rotational Guidance Track System

To complete the passive-mechanical rotating shackle system, a guidance track system comprising four 7-foot straight aluminum u-channels (two for each flow channel) with 127 holes each are arranged in the plane of the rotating pinion gear to serve as a track for the prescribed rotation. The drilled holes along the length of the u-channel allowed for a robust, custom track to be configured with the bolts and pins as can be seen in FIGS. 6 and 7. In another example of the track construction, a standard bike chain, as can be seen in FIG. 5, was used to pair with the pinion gear. To configure for better track guidance, a robust u-channel track has a greater channel height to accommodate slight pinion tilts, and this method allows for the rotational method and length of rotation to be varied as the operator desires. If churning patterns are desired, then the pins within the u-channels can be configured to have alternating segments of pins and no pins. With the same rationale, continuous rotation can be achieved by arranging one u-channel side with all pins while having no pins on the other u-channel side. As can be seen in FIG. 7, the u-channel is lined with blue strips of ultra-high molecular-weight polyethylene for the areas where there are no pins to allow for proper gear meshing on the opposite side where there are pins. Without the low-friction padding as a backing, the pinion gear will attempt to "push out" when it encounters a sequence of pins.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

What is claimed is:

1. An inline system for product processing comprising:
a track configured to impart translational kinematics to shackled product transporting the shackled product through one or more processing stations;
a stabilizing rod configured to extend through a cavity of the shackled product; and
a shackle system configured to impart rotational kinematics to the shackled product;
wherein:
the shackle system comprises:
a rotator; and
a rotating shackle;
the rotator is configured to undergo rotational kinematics causing rotation of the rotating shackle;
the inline system provides both translational movement and rotational movement of the shackled product through one or more of the processing stations;

the stabilizing rod is extendable and retractable;

one or more of the processing stations comprise heat transfer media through which the shackled product translates and rotates; and the translational movement and the rotational movement of the shackled product through the heat transfer media provides for enhanced control and transport phenomena between the shackled product and the heat transfer media over only translational movement of the shackled product through the heat transfer media.

2. The inline system of claim 1, wherein the heat transfer media is selected from a group consisting of cold air, chilled water, ice slurry, hot water, and a combination thereof.

3. The inline system of claim 1, wherein the rotational kinematics is alternating rotational kinematics causing rotation of the rotating shackle back and forth in a clockwise and counterclockwise direction.

4. The inline system of claim 1, wherein:

the rotator comprises a gear;

the track comprises a rack; and the gear meshes with the rack causing, at least in part, the rotational kinematics on the rotator as the shackle system moves along the track.

5. The inline system of claim 1, wherein:

the rotator comprises a rotator peg;

the track comprises a track peg; and the rotator peg interfaces with the track peg causing, at least in part, the rotational kinematics on the rotator as the shackle system moves along the track.

6. The inline system of claim 1, wherein the shackle system further comprises a trolley;

wherein the trolley is coupled to the track and configured to undergo the translational movement along the track causing the shackle system to move along the track.

7. A method for processing product with the inline system of claim 1 comprising:

shackling the product to the shackle system coupled to the track;

moving the product, with the shackle system, along the track; and rotating the product, at least in part, with the shackle system.

8. The method of claim 7 further comprising:

halting, with a brake, the rotation of the rotating shackle.

9. The method of claim 7 further comprising:

holding in place, with a brake, an orientation of the shackled product on the shackle system.

10. The inline system of claim 1 further comprising an external entrapment configured to extend around at least a portion of an exterior of the shackled product;

wherein the external entrapment is extendable and retractable.

11. An inline system for product processing comprising:

a track configured to impart translational kinematics to shackled product transporting the shackled product through one or more processing stations;

an external entrapment configured to extend around at least a portion of an exterior of the shackled product; and a shackle system configured to impart rotational kinematics to the shackled product;

wherein:

the shackle system comprises:

a rotator; and a rotating shackle;

the rotator is configured to undergo rotational kinematics causing rotation of the rotating shackle;

the inline system provides both translational movement and rotational movement of the shackled product through one or more of the processing stations;

the external entrapment is extendable and retractable;

one or more of the processing stations comprise heat transfer media through which the shackled product translates and rotates; and the translational movement and the rotational movement of the shackled product through the heat transfer media provides for enhanced control and transport phenomena between the shackled product and the heat transfer media over only translational movement of the shackled product through the heat transfer media.

12. The system of claim 11, wherein the heat transfer media is selected from a group consisting of cold air, chilled water, ice slurry, hot water, and a combination thereof.

13. The inline system of claim 11, wherein the rotational kinematics is alternating rotational kinematics causing rotation of the rotating shackle back and forth in a clockwise and counterclockwise direction.

14. The inline system of claim 11, wherein:

the rotator comprises a gear;

the track comprises a rack; and the gear meshes with the rack causing, at least in part, the rotational kinematics on the rotator as the shackle system moves along the track.

15. The inline system of claim 11, wherein:

the rotator comprises a rotator peg;

the track comprises a track peg; and the rotator peg interfaces with the track peg causing, at least in part, the rotational kinematics on the rotator as the shackle system moves along the track.

16. The inline system of claim 11 further comprising a stabilizing rod configured to extend through a cavity of the shackled product;

wherein the stabilizing rod is extendable and retractable.

17. The inline system of claim 11, wherein the shackle system further comprises a trolley;

wherein the trolley is coupled to the track and configured to undergo the translational movement along the track causing the shackle system to move along the track.

18. A method for processing product with the inline system of claim 11 comprising:

shackling the product to the shackle system coupled to the track;

moving the product, with the shackle system, along the track; and rotating the product, at least in part, with the shackle system.

19. The method of claim 18 further comprising:

halting, with a brake, the rotation of the rotating shackle.

20. The method of claim 18 further comprising:

holding in place, with a brake, an orientation of the shackled product on the shackle system.

21. An inline system, for product processing comprising:

a track configured to impart translational kinematics to shackled product transporting the shackled product through one or more processing stations; and a shackle system configured to impart rotational kinematics to the shackled product;

wherein:

the shackle system comprises:

a rotator; and a rotating shackle;

the rotator is configured to undergo rotational kinematics causing rotation of the rotating shackle;

the inline system provides both translational movement and rotational movement of the shackled product through one or more of the processing stations;

one or more of the processing stations comprise heat transfer media through which the shackled product translates and rotates;

the translational movement and the rotational movement of the shackled product through the heat transfer media provides for enhanced control and transport phenomena between the shackled product and the heat transfer media over only translational movement of the shackled product through the heat transfer media; and at least one of:

the rotator comprises a gear, the track comprises a rack, and the gear meshes with the rack causing, at least in part, the rotational kinematics on the rotator as the shackle system moves along the track;

the rotator comprises a rotator peg, the track comprises a track peg, and the rotator peg interfaces with the track peg causing, at least in part, the rotational kinematics on the rotator as the shackle system moves along the track;

the inline system further comprises a stabilizing rod configured to extend through a cavity of the shackled product, wherein the stabilizing rod is extendable and retractable; or the inline system further comprises an external entrapment configured to extend around at least a portion of an exterior of the shackled product, wherein the external entrapment is extendable and retractable.

22. The system of claim 21, wherein the heat transfer media is selected from a group consisting of cold air, chilled water, ice slurry, hot water, and a combination thereof.

23. The inline system of claim 21, wherein the rotational kinematics is alternating rotational kinematics causing rotation of the rotating shackle back and forth in a clockwise and counterclockwise direction.

24. The inline system of claim 21, wherein the shackle system further comprises a trolley;

wherein the trolley is coupled to the track and configured to undergo the translational movement along the track causing the shackle system to move along the track.

25. A method for processing product with the inline system of claim 21 comprising:

shackling the product to the shackle system coupled to the track;

moving the product, with the shackle system, along the track; and rotating the product, at least in part, with the shackle system.

26. The method of claim 25 further comprising:

halting, with a brake, the rotation of the rotating shackle.

27. The method of claim 25 further comprising:

holding in place, with a brake, an orientation of the shackled product on the shackle system.

* * * * *